Nov. 21, 1961 A. SZERLIP 3,010,076

KEYED CRYSTAL CONTROLLED OSCILLATORS

Filed April 1, 1957

ALEXANDER SZERLIP, INVENTOR

BY Edwin A. Oser

AGENT

United States Patent Office 3,010,076

Patented Nov. 21, 1961

3,010,076

KEYED CRYSTAL CONTROLLED OSCILLATORS

Alexander Szerlip, Los Angeles, Calif., assignor to Hughes Aircraft Company, Culver City, Calif., a corporation of Delaware Filed Apr. 1, 1957, Ser. No. 650,048
3 Claims. (Cl. 331—139)

Figures 1, 2:
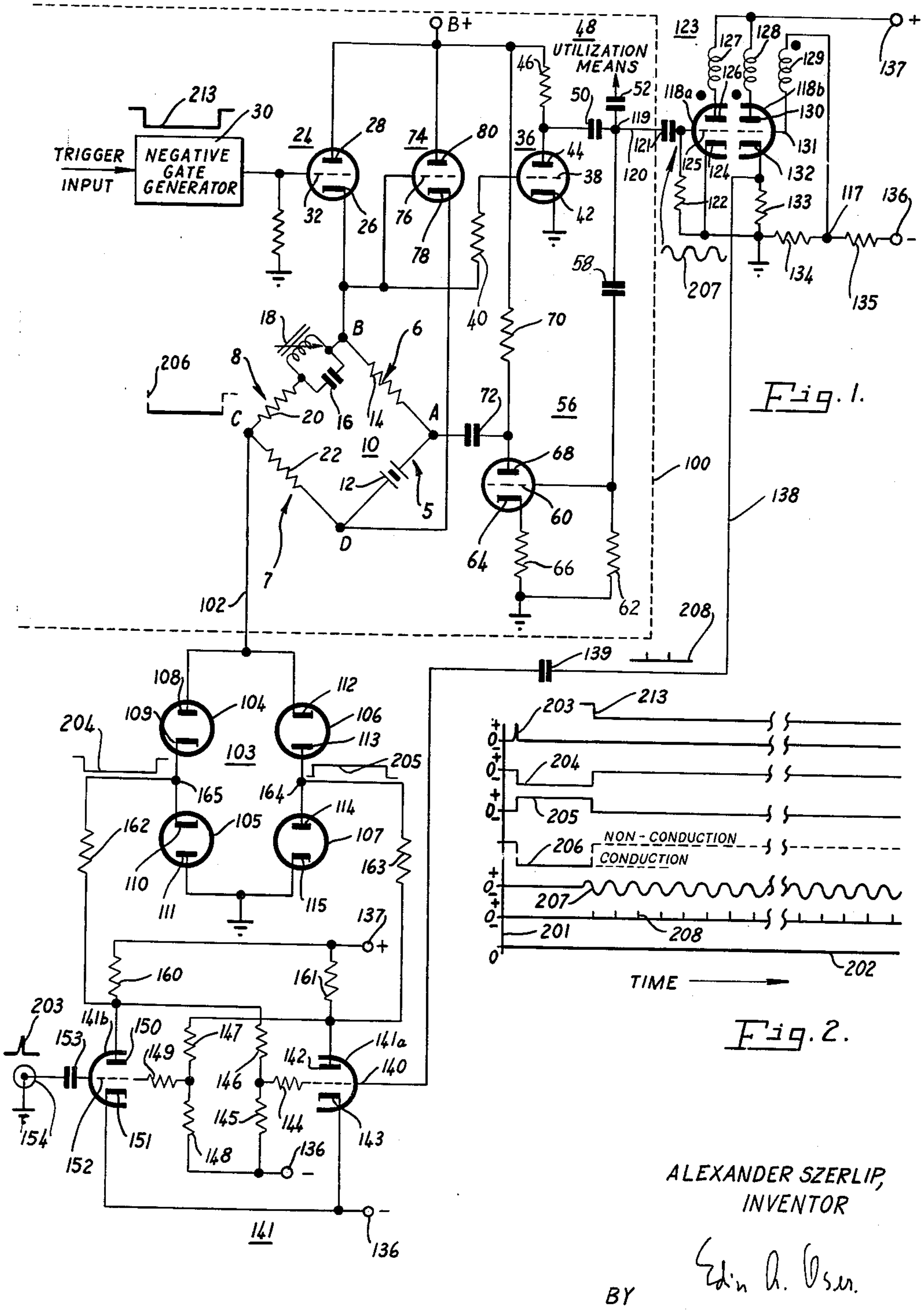

This invention relates to pulse-keyed crystal-controlled oscillators and more particularly to an improved oscillator of this type. The present invention is an improvement upon applicant's Patent No. 2,697,172 assigned to the same assignee as is the present invention and entitled "Pulse Keyed Crystal Controlled Oscillator."

The present invention contemplates an electronic switch circuit which inactivates from the circuit of the above-mentioned invention the LC or tuned circuit employed therein to excite the crystal oscillator thereof into oscillation. This switch circuit is energized as soon as oscillation of the crystal has begun, so that during the remainder of the gating interval the circuit operates simply as a crystal-controlled oscillator. At the end of the interval the LC circuit is reactivated so that it performs its normal circuit functions.

In the above-identified patent there was disclosed a keyed crystal-controlled oscillator in which a bridge circuit is employed. One arm of the bridge includes a parallel-tuned LC circuit. The conjugate arm of the bridge includes a piezo-electric crystal unit. The two remaining arms include resistors. The tuned LC circuit is shock excited into oscillation by a gating pulse. The oscillations are amplified and are applied through a regenerative feedback network to the bridge to sustain oscillation of the piezoelectric crystal unit. As soon as the oscillation of the crystal has begun the shock excited tuned circuit is no longer needed. While the circuit of the patented invention is perfectly operable with the tuned circuit in place, a "jitter," or a small degree of instability is imparted to the oscillation. If the "jitter" were eliminated the range of operation of the pulse keyed crystal controlled oscillator and its accuracy are improved. It has been found that if after oscillations have been excited in the crystal unit the tuned LC circuit is rendered inoperative, the stability and accuracy of the oscillations of the crystal-controlled oscillator are much greater.

Accordingly, it is an object of this invention to provide a circuit cooperating with a keyed crystal-controlled oscillator by which its stability and accuracy is improved.

It is another object of this invention to provide a more stable and accurate keyed crystal-controlled oscillator.

These and other objects of the invention will be more fully understood from the specification and claims which follow when taken together with the drawing, in which FIG. 1 is a circuit diagram of the improved keyed crystal-controlled oscillator including the improvements according to this invention; and FIG. 2 is a chart of a series of waveforms representative of the operation of the circuit of FIG. 1.

Referring now to FIG. 1 the dashed-in box 100 contains the circuit of the invention of the previously mentioned Szerlip Patent No. 2,697,172. In the original circuit the point C of the bridge having the junction A, B, C, D is normally grounded.

Referring now to block 100 in FIG. 1, the bridge circuit 10 comprises series connected first, second, third and fourth arms numbered 5, 6, 7 and 8, respectively. First arm 5 comprises a piezoelectric crystal 12 having a selected natural frequency. The second and third arms include resistors 14 and 22, respectively. The fourth arm comprises a resistor 20 serially connected to a parallel resonant circuit 16—18 which is tuned to a frequency slightly higher than the natural frequency of the crystal.

One end of each of the second and third arms are connected to opposite extremities of arm 5 to form junctions A and D, respectively. The fourth arm 8 is connected at one end to the remaining extremity of the second arm 6 to form junction B and the other end of fourth arm 8 is connected to the remaining extremity of third arm 7 to form junction C. An electron tube 24 has its cathode 26 connected to junction B of bridge circuit 10 and its anode 28 connected to a source of B+ potential which is positive relative to the point of reference potential.

A trigger pulse from an external source, such as, for example, the master keyer in a radar system, is applied to the input of a negative gate generator 30. Negative gate generator 30 is any device, such as a monostable multivibrator, which produces a single negative square-wave pulse such as 213 of a given duration which is initiated either in time coincidence with or a given time delay after the application of a trigger pulse thereto. The output of negative gate generator 30 is applied to control electrode 32 of electron tube 24.

Electron tube 36 is utilized as both an amplifier and a link in the feedback path. Its control electrode 38 is connected to junction B of bridge circuit 10 through a resistor 40. Cathode 42 of electron tube 36 is connected to the point of reference potential and anode 44 is connected through a load resistor 46 to the source of B+ potential. The output of electron tube 36 is coupled to the input of a utilization means by serially connected capacitors 50 and 52. If the oscillator is utilized in a marker generator, the utilization means may include a device, such as a monostable blocking oscillator, for converting the sinusoidal output of the oscillator to marker pulses having a repetition frequency equal to either the oscillator frequency or a sub-harmonic thereof, and the cathode ray display device to which the marker pulses are applied.

The output of electron tube 36 is also coupled through the capacitor 50 and a capacitor 58 to the grid 60 of an electron tube 56, the cathode 64 of which is connected to the point of reference potential through a bias resistor 66. Anode 68 of electron tube 56 is connected through a load resistor 70 to the aforementioned source of B+ potential. The anode 68 of electron tube 56 is coupled through a capacitor 72 to junction A of bridge circuit 10. In addition to the above, a cathode follower circuit including an electron tube 74 couples the junction B of bridge circuit 10 to the junction D. More particularly, electron tube 74 has its control electrode 76 connected to junction B of bridge circuit 10, its cathode 78 connected to junction D of bridge circuit 10, and its anode 80 connected to the source of B+ potential.

The method of operation of the circuit shown in block 100 of FIG. 1 will now be considered. Electron tube 24 is connected as a cathode follower with arm 8 of bridge circuit 10 being its cathode load impedance. In its quiescent state electron tube 24 draws current through inductance 18 and resistance 20. The control grid of tube 24 is returned to ground through a resistor whereby the voltage drop across resistance 20 provides a proper bias. When electron tube 24 is in a quiescent conducting state the impedance between junctions B and C of bridge circuit 10 is sufficiently low so that there is no tendency for the circuit to oscillate.

The application of a trigger pulse to negative gate generator 30 results in a negative square-wave pulse, shown in FIG. 2A, being impressed in the grid of electron tube 24. The negative square-wave pulse has sufficient amplitude to cut off the flow of current through electron tube 24, thereby greatly increasing the effective impedance existing between junctions B and C of bridge circuit 10 and in addition the sudden cutting off of electron tube 24, results in the tuned circuit composed of capacitance 16 and inductance 18 being shock excited into oscillation. It is apparent that the ensuing oscillation would gradually decrease in amplitude due to the damping of the circuit unless energy is continuously injected back into the oscillating circuit.

Accordingly, these oscillations, appearing between junctions B and C of bridge circuit 10, are applied through resistance 40 to the input of amplifier tube 36. The purpose of resistance 40 is to provide sufficient bias for electron tube 36 to overcome the positive potential which exists at junction B of bridge circuit 10 due to the interelectrode current of tube 24 when it is in its quiescent conducting state.

The amplified oscillations appearing in the output of electron tube 36 are impressed on the control electrode of amplifier tube 56. The still further amplified oscillations appearing at the anode of electron tube 56 are applied between junctions A and C of bridge circuit 10. The arms of bridge circuit 10 between junctions A and B and between junctions B and C form a voltage divider, so that a fixed proportion of the amplified oscillations applied between junctions A and C of bridge circuit 10 appear between junctions B and C of bridge circuit 10 and are fed back as an input to electron tube 36. Since the output of each of electron tubes 36 and 56 is phase inverted relative to its respective input, the output of electron tube 56, appearing between junctions A and C of bridge circuit 10, will be in phase with the input to electron tube 36, appearing between junctions B and C of bridge circuit 10. Therefore, the fixed proportion of the oscillations fed back to the input of electron tube 36 are of proper phase to provide regeneration, and the conditions for sustained oscillation are fulfilled. Crystal 12 controls the frequency of oscillation.

According to the present invention the junction C of bridge circuit 10 is connected over a lead 102 to an electronic switch generally indicated at 103. Electronic switch 103 comprises a diode rectifier bridge incorporating diodes 104, 105, 106 and 107. Diode 104 has its anode 108 connected with lead 102 and cathode 112 of diode 106. The cathode 109 of diode 104 is connected to the cathode 110 of diode 105. The anode 111 of diode 105 is connected to ground. The anode 113 of diode 106 is connected to the anode 114 of diode 107. Cathode 115 of diode 107 is connected to ground.

In the oscillator circuit shown in the dashed-in box 100 a utilization means 48 is normally connected to a junction point 119 by capacitor 52. Alternatively, according to the present invention, a coupling capacitor 121 is connected by lead 120 from output terminal 119 to the control grid 125 of a triode 118*a* forming part of a monostable multivibrator or blocking oscillator 118. The monostable multivibrator 118 has dual triode portions 118*a* and 118*b*. To the anode 126 of triode portion 118*a* one terminal of the primary 127 of a multivibrator transformer 123 is connected. The other terminal of primary winding 127 is connected to a source of positive potential indicated at 137. Multivibrator transformer 123 has a secondary winding 128 and a tertiary winding 129. Secondary winding 128 has one of its terminals connected to anode 130 of triode 118*b*. The other terminal of winding 128 is connected to positive potential source 137. Tertiary winding 129 has one of its terminals connected to control grid 131 of triode 118*b*. The other terminal of winding 129 is connected to a negative potential point 117 provided by the junction of a pair of resistors 134 and 135 connected in series between ground and a source of negative potential 136. A grid leak resistor 122 is connected between control grid 125 of triode 118*a* and ground. Cathode 124 of triode 118*a* is connected to ground. A cathode bias resistor 133 is connected between cathode 132 of triode 118*b* and ground. A lead 138 connects a capacitor 139 between cathode 132 of triode 118*b* and the control grid 140 of a triode 141*a* forming part of a bistable multivibrator 141.

Multivibrator 141 comprises dual triodes 141*a* and 141*b*. The cathode 143 of triode 141*a* is connected to source of negative potential 136. Anode 142 of triode 141*a* is connected to an anode load resistor 161 and an anode-to-grid coupling resistor 147. Resistor 161 is connected also to source of positive potential 137. Anode 142 of triode 141*a* is connected through a resistor 163 to the junction 164 of anodes 113 and 114 of diodes 106 and 107. A grid current limiting resistor 144 is connected between grid 140 of triode 141*a* and the junction of anode-to-grid resistor 146 and a grid leak resistor 145. Grid leak resistor 145 is connected between resistor 144 and negative potential point 136. Resistor 146 is connected between resistor 145 and anode 150 of triode 141*b*. An anode load resistor 160 is connected between anode 150 and positive potential point 137. Grid current limiting resistor 149 is connected between control grid 152 of triode 141*b* and the junction of resistor 147 and a grid leak resistor 148. Grid leak resistor 148 is connected to negative potential point 136. Cathode 151 of triode 141*b* is connected to negative potential point 136. Input terminal 154 which may be a co-axial transmission line as illustrated is connected through a capacitor 153 to control grid 152 of triode 141*b*. Anode 150 of triode 141*b* is connected through a resistor 162 to the junction 165 of cathodes 109 and 110 of diodes 104 and 105.

The operation of the improved pulse-keyed crystal-controlled oscillator circuit of this invention may be more fully understood from the description which follows taken with reference to the circuit diagram of FIG. 1 and the waveform diagrams of FIG. 2 to which reference is now made.

In FIG. 2 the abscissa 202 denotes time as indicated by the direction of the arrow from a starting time indicated on the abscissa at 0. The ordinates 201 show zero lines for each of the waveforms illustrated and described below. The waveform amplitudes then extend in the positive or negative directions as shown.

Waveform 203 is a positive going pulse to illustrate an initiating or triggering pulse which may be applied to input terminal 154 of bistable multivibrator 141.

Waveform 204 represents a negative going pulse from one half of bistable multivibrator 141 in its quiescent state, viz. from anode 150, which is applied to the junction 165 between diodes 104 and 105 to render diodes 104 and 105 conducting.

Waveform 205 represents the positive going complementary pulse from the other half of bistable multivibrator 141 in its quiescent state, which is applied to junction 164 of diodes 106 and 107 to render the diodes 106 and 107 conducting.

Waveform 206 illustrates schematically the condition of conduction between the bridge junction C and ground. At zero time and prior to the beginning of oscillation of the crystal the junction C is at ground potential because the diodes 104, 105 and 106, 107 are conducting.

Waveform 207 illustrates the oscillatory wave of the crystal oscillator which appears at lead 120 and is impressed through capacitor 121 to the grid 125 of triode 118*a* of monostable multivibrator 120.

Waveform 208 represents the output pulses of monostable multivibrator 123 appearing at cathode 132 of triode 118*b* and applied along lead 138 through capacitor 139 to the grid 140 of triode 141*a* of bistable multivibrator 141.

In time sequence with reference to FIGS. 1 and 2 the operation of the improved keyed crystal-controlled oscillator is as follows:

At time zero as shown in FIG. 2 an external triggering pulse 203 applied at input terminal 154 sets the circuit to its quiescent condition. The triggering pulse normally occurs at the termination of a gating pulse, such as pulse 213, which operates the pulse-keyed crystal-controlled oscillator of box 100. Triggering pulse 203 occurs at or immediately following the positive going or trailing edge of the pulse 213. At the occurrence of pulse 203 triode 141*b* is rendered conductive so that the voltage of anode 150 thereof drops to a point more negative than ground. The resulting pulse 204 of anode 150 is applied to junction 165 of diodes 104 and 105. Thus cathodes 109 and 110 will be more negative than the respective anodes 108 and 111 and the diodes are thereby rendered conducting. Similarly and at the same time, triode 141*a* is rendered nonconducting so that its anode 142 rises to a potential more positive than ground to apply a positive going pulse 205 to junction 164 of diodes 106 and 107. Thus anodes 113 and 114 are more positive than the respective cathodes 112 and 115 to render the diodes 106 and 107 conducting.

The conduction of diodes 104, 105 in series and of diodes 106, 107 in series places junction C of the bridge A, B, C, D of the circuit of block 100 at ground potential. In this quiescent condition monostable multivibrator or blocking oscillator 123 is also quiescent since its operation as described below requires the presence of pulses.

The operation of the bistable multivibrator 141 is according to well known principles and as has been described above is now in one of its states of conduction. How it is triggered into its other state of conduction will be described after the subsequent description of the operation of the monostable multivibrator 123.

Monostable multivibrator 123 comprises the triodes 118*a* as a trigger amplifier and 118*b* as a blocking oscillator. The primary winding 127 of the multivibrator transformer receives the sine wave output signal of the crystal oscillator 207 while the oscillator is in operation. The secondary and tertiary windings 128, 129 of the multivibrator transformer are connected to anode 130 and grid 131 circuits to create a pulse in triode 118*b* each time a predetermined amplitude during each cycle of the sine wave 207 occurs. These pulses are as shown by wave 208 (FIG. 2) and appear at the cathode 131 of triode 118*b*.

During the quiescent interval as described above monostable multivibrator 123 is inoperative since a driving pulse or sine wave 207 is necessary to excite it.

An initiating pulse as indicated at 213 in FIG. 2 applied at the input grid 32 of amplifier 24 within block 100 of FIG. 1 excites the pulse-keyed crystal-controlled oscillator into operation so that a sine wave such as 207 appears on lead 120 and is applied through the capacitor 121 to grid 125 of triode amplifier 118*a*. Amplified waves appear in winding 127 of the multivibration transformer and are coupled to grid winding 129 of the transformer to be applied to grid 131 of triode 118*b* to initiate a pulse in the well known manner. The firing of monostable multivibrator 123 results in a series of pulses 208, one for each cycle of the crystal oscillator sine wave 207 at cathode 132 of triode 118*b*.

The pulses 208 applied to grid 140 of triode 141*a* of bistable multivibrator 141 cause triode 141*a* to conduct and render triode 141*b* nonconducting. As a result the junction 165 becomes positive with respect to ground since triode 141*b* is nonconducting and the junction 164 becomes negative with respect to ground as a result of the conduction of triode 141*a*. Accordingly, all four diodes 104, 105 and 106, 107 cease conduction removing the point C of bridge A, B, C, D from ground or, actually, creating a high impedance between point C and ground.

Because of the low impedance between junctions B and D produced by cathode follower tube 24, the oscillations across the LC tuned circuit 18 are short-circuited or highly damped whereby tuned circuit 18 is essentially no longer in the bridge circuit and any continuing oscillation therein due to the shock excitation of the oscillator initiating pulse originally applied to triode 24 is no longer present. The removal of LC circuit 18 from the operation leaves the crystal oscillator 12 the only frequency controlling element in the circuit and the crystal 12 continues to oscillate as long as the gate pulse 213 is applied. So long as oscillation of crystal 12 continues trigger pulses 208 will be generated and applied to grid 140 of triode 141*a* to keep it conducting so that the LC circuit 18 is effectively removed from the circuit. When the gating pulse 213 terminates, the next trigger corresponding to pulse 203 is applied at input terminal 154 to render triode 141*b* conducting and triode 141*a* nonconducting whereupon the quiescent condition previously described is reached again and the point C of the bridge A, B, C, D is again connected to ground through diodes 104, 105 and 106, 107.

There has been described an improvement in a pulse-keyed crystal-controlled oscillator wherein during a gating interval an electronic diode switch is employed to introduce damping into a shock-excited resonant circuit after the oscillations excited therein started operation of the crystal controlled oscillator.

What is claimed as new is:

1. A crystal-controlled oscillator including a bridge circuit composed of a first arm having a piezo-electric crystal anti-resonant at a given frequency, a second arm having a first resistor, one end of said second arm being connected to one end of said first arm at a first junction, a third arm having a capacitor and an inductor connected in parallel to form a tuned circuit anti-resonant at a frequency slightly higher than said given frequency, one end of said third arm being connected to the remaining end of said second arm at a second junction, a fourth arm having a second resistor, said fourth arm being connected from the remaining end of said third arm at a third junction to the remaining end of said first arm at a fourth junction; means for connecting said second junction through a low-impedance path to a terminal maintained at a substantially fixed potential; means coupled to said second and third junctions for shock exciting said tuned circuit into oscillation; amplifying means responsive to signals appearing at said third junction; means for impressing an output signal produced by said amplifying means to said first junction to provide regenerative feedback thereby to cause oscillations controlled by said piezo-electric crystal to commence; and means responsive to an output signal produced by said amplifying means for electronically disconnecting said second junction from said low-impedance path at the commencement of said oscillations whereby the resistance of said second resistor substantially isolates said tuned circuit from said piezo-electric crystal.

2. The crystal-controlled oscillator as defined in claim 1 wherein said means for connecting said second junction through a low-impedance path to a terminal maintained at a substantially fixed potential comprises a fifth and a sixth junction, first and second diodes connected and poled to allow current flow from said second junction and said terminal maintained at said substantially fixed potential, respectively, to said fifth junction; third and fourth diodes connected from said sixth junction to said second junction and said terminal maintained at said substantially fixed potential, respectively, said third and fourth diodes being poled to allow current flow away from said sixth junction; a multivibrator responsive to successive trigger signals for producing first and second complementary output signals, said second output signal being more positive than said first output signal during the absence of said trigger signals; a third resistor connected from a first output terminal of said multivibrator to said fifth junction for applying said first output signal thereto; and a fourth resistor connected from a second output terminal of said multivibrator to said sixth junction for applying said second output signal thereto.

3. The crystal-controlled oscillator as defined in claim 2, wherein said means responsive to an output signal produced by said amplifying means for increasing the impedance of said low-impedance path at the commencement of said oscillations comprises a monostable blocking oscillator responsive to an output signal produced by said amplifying means thereby to produce a series of trigger signals and means for applying said series of trigger signals to said multivibrator to change the state of the output signals thereof, thereby to make said first output signal more positive than said second output signal, whereby the impedance of said low-impedance path from said second junction to said terminal maintained at said substantially fixed potential is substantially increased.

References Cited in the file of this patent

UNITED STATES PATENTS

| | | |
|---|---|---|
| 1,642,861 | Turner | Sept. 20, 1927 |
| 2,103,090 | Plebanski | Dec. 21, 1937 |
| 2,263,755 | Bock | Nov. 25, 1941 |
| 2,419,570 | Labin et al. | Apr. 29, 1947 |
| 2,697,172 | Szerlip | Dec. 14, 1954 |